United States Patent [19]

Nall

[11] Patent Number: 5,029,232

[45] Date of Patent: Jul. 2, 1991

[54] SATELLITE COMMUNICATIONS NETWORK

[75] Inventor: David C. Nall, Garner, Iowa

[73] Assignee: Cycle-Sat., Inc., Forest City, Iowa

[21] Appl. No.: 295,984

[22] Filed: Jan. 12, 1989

[51] Int. Cl.$^5$ .................... H04B 17/00; H04H 9/00
[52] U.S. Cl. .................................. 455/2; 455/12; 358/84
[58] Field of Search .................................. 455/2–6, 455/67, 12; 358/84, 86; 370/75, 76, 104

[56] References Cited

U.S. PATENT DOCUMENTS

| 4,435,843 | 3/1984 | Eilers et al. | |
|---|---|---|---|
| 4,475,123 | 10/1984 | Dumbauld et al. | |
| 4,605,973 | 8/1986 | Von Kohorn | |
| 4,625,235 | 11/1986 | Watson | |
| 4,638,359 | 1/1987 | Watson | |
| 4,720,873 | 1/1988 | Goodman et al. | 455/2 |
| 4,751,732 | 6/1988 | Kamitake | 455/2 |
| 4,768,087 | 8/1988 | Taub et al. | 455/2 |
| 4,876,736 | 10/1989 | Kiewit | 455/2 |
| 4,876,737 | 10/1989 | Woodworth et al. | 455/12 |

Primary Examiner—Curtis Kuntz

Attorney, Agent, or Firm—Burd, Bartz & Gutenkauf

[57] ABSTRACT

A satellite communication network includes an encoder for encoding a signal including message, addressing, and command information and a transmitter connected with the encoder for transmitter the encoded signal to a satellite. The message information may comprise video and/or audio information. A plurality of receivers located at a remote location from the transmitter are operable to receive selected portions of the encoded signal from the satellite in response to the addressing information contained in the encoded signal. A decoder is connected with each receiver for decoding the received portion of the encoded signal. The decoder includes a control device which is operable to control peripheral recording devices including one or more video tape recorders and a printer to record the video information from the decoded signal in response to command information contained in the encoded signal. The satellite communications system according to the invention provides an automatic system for downlinking and recording programming during low usage times for subscribing television stations.

9 Claims, 6 Drawing Sheets

FIG. I

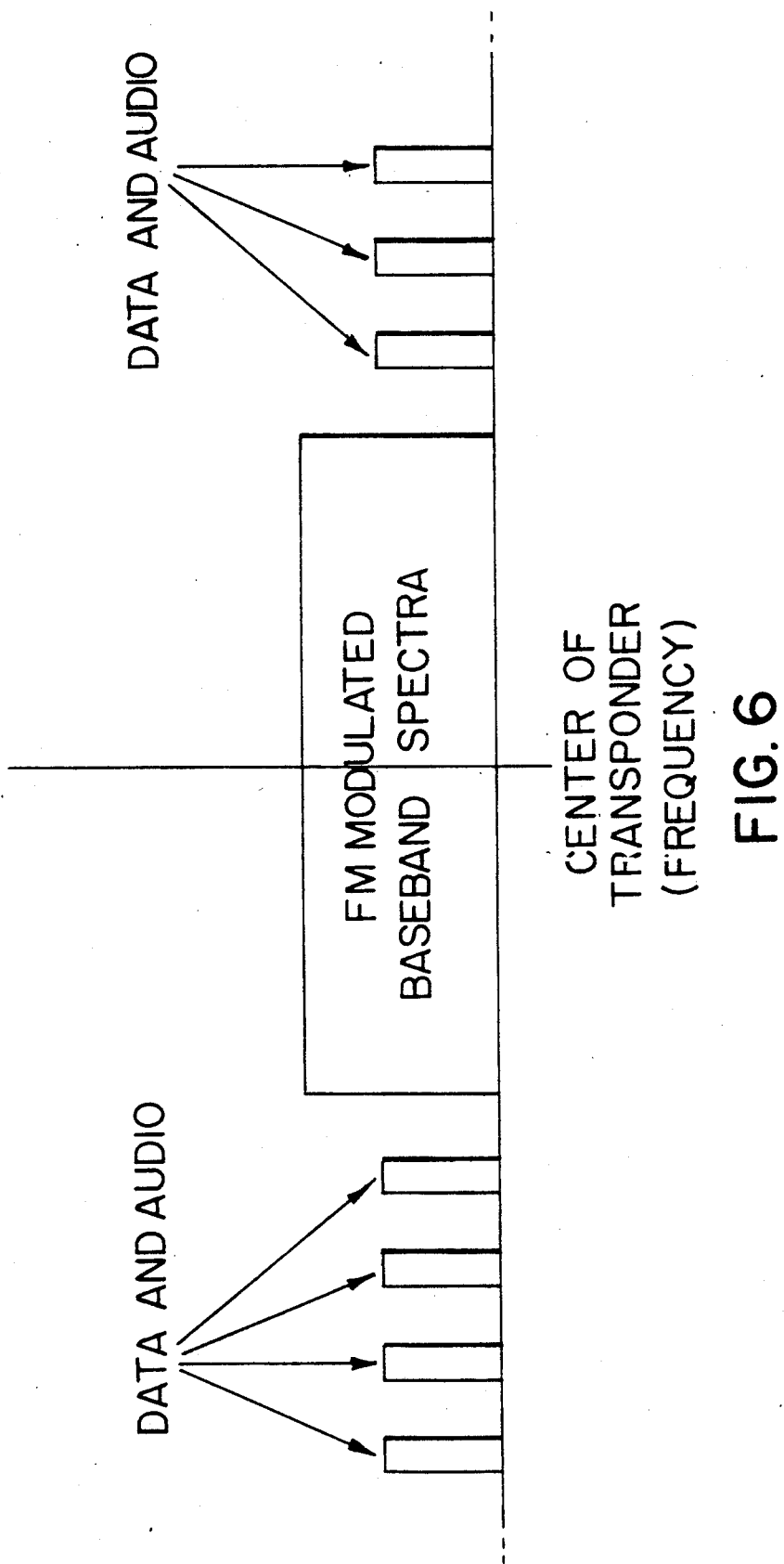

SATELLITE COMMUNICATIONS NETWORK

BACKGROUND OF THE INVENTION

Television stations are currently obtaining a greater percentage of their programming from a satellite source, therefore requiring the dedication of station equipment and manpower for the downlinking and the recording of broadcast programming. Typically, a remote television station or cable television system subscribes to various programming sources whether they be recorded television shows, movies or recorded commercials, and the television station has a receiver for receiving the particular programming to which it subscribed which is normally broadcast from a transmitter via a satellite. A number of satellites may be provided, each of which transmits one or more programs, and a television station may subscribe to more of the broadcast programs. When the selected programming is being broadcast or transmitted via the satellite to which the television station has subscribed, a technician at the television station normally operates the receiver at the station to receive the selected program. The technician tunes the receiver to the satellite and manually operates one or more video tape recorders at the station for recording the programming to which it has subscribed. The recorded video information is then played back by the television for its local broadcast at the designated time or it may be retransmitted directly in the case of a cable television system. This manual reception and operation of the video recorders at the local television station requires excessive manpower and equipment. Futhermore, the recording of programming information from a satellite source often requires use of equipment which might otherwise be used for the local broadcasts of the television station.

The present invention relates to an automated system whereby a television station may subscribe to programming from a remote source of programming. The source of information being transmitted to the local television station via satellite may contain video and/or audio programming information as well as addressing and command information whereby the remote transmitter can operate the local receiver and video tape recording devices to record the selected or subscribed portion of the broadcast programming which the particular local television station has contracted to receive. In this manner, the remote programming may be broadcast during off peak hours when the video tape recorders and other hardware at the local subscribing television station are not otherwise being used in the programming of its own broadcast material.

BRIEF DESCRIPTION OF THE PRIOR ART

Satellite communications networks are well known in the patented prior art as evidenced by the U.S. Pat. Nos. to Watson No. 4,625,235 and No. 4,638,359. U.S. Pat. No. 4,625,235, for example, discloses a network wherein video signals contain address and command data pulses which are transmitted to a plurality of local television systems. Each local system includes a decoder/controller/switcher apparatus. The decoder section removes the data from the video signal to make the data available from control and information purposes. A microcomputer at the local television station responds to data from the signal by effecting appropriate switching among various video and audio program inputs and also provides control signals to operate local video tape machines at the television station. The signals broadcast within the satellite communications network of the Watson device are primary video signals which contain address and command data pulses in the vertical blanking intervals of the video signals. U.S. Pat. No. 4,638,359 discloses a similar satellite communications network wherein binary data comprising command signals and information is converted into a pulse width modulated waveform which is transmitted with a video signal to remote local subscribers.

While the prior devices operate satisfactorily, they are rather complicated and costly requiring excessive hardware. This is necessary owing to the synthesis of the video signal wherein address and command data pulses are provided in the vertical blanking intervals of the video signal being broadcast.

The present invention was developed in order to overcome these and other drawbacks of the prior devices by providing a satellite communication network wherein the primary video signals which do not contain address and command data pulses in the vertical blanking intervals thereof, are transmitted to a plurality of remote subscribers each provided with a decoder/controller apparatus to extract the data from the data carrier signals and effect safe control of machines at the remote subscriber or television stations for recording video signals being transmitted. As opposed to the prior techniques, in the present invention, the data stream has been removed from the video signal and included as a separate modulated carrier in the composite of the video and audio subcarriers. The data rate is 4800 characters per second and uses a common synchronous signalling format. The messages are divided into packets which have a unique bit pattern preceding and following the message and include an error checking code. A unique pattern format for the messages is used within the body of the packets so that the cyphers can easily identify packets from a designated transmitting station. The messages have a type-identifier which instructs the cypher how the message is to be used therein.

SUMMARY OF THE INVENTION

Accordingly, it is a primary object of the present invention to provide a satellite communications network including an encoder device for encoding a signal including message, addressing and command information and a transmitter connected with the encoder device for transmitting the encoded signal. The message information may comprise video and/or audio information. The communications network according to the invention also includes a plurality of receivers for receiving selected portions of the transmitted encoded signal. A decoder device is connected with each receiver for decoding the received portion of the encoded signal. The decoding device also includes a controller which is operable to control one or more peripheral recording devices connected to the decoder for recording video information from the decoded signal in response to the command information.

It is a more particular object of the invention to provide in the encoder device a data base manager containing programming and data distribution information and producing a distribution signal corresponding to the distribution of selected video information among a plurality of the receivers. The encoder also includes a control device connected with the data base manager for generating a data stream containing video addressing and command information in accordance with the distribution signal. A serial interface device converts the data stream from the controller into a serial data stream and a data modulator is connected with the serial interface device for encoding the serial data stream for transmission.

According to yet another object of the invention, the decoder device connected with each receiver includes a data demodulator for converting the decoder signal to a serial stream of data information, and a data interface device connected between the receiver and the data demodulator for converting the serial data stream to parallel for operation of the decoder controller.

The decoder controller comprises a microprocessor which responds to addressing and command information from the parallel data stream to control the operation of the recording devices. The decoder controller also includes an EPROM device containing software for operating the microprocessor and a memory which contains addressing information corresponding with the receiver.

According to another object of the invention the peripheral recording devices comprise at least one video tape recorder for recording the video information broadcast with the encoded signal and at least one printer which provides a hard copy of the video signal information recorded by each video tape recorder.

It is yet another object of the invention to provide a display device at both the encoder and the decoder. The encoder display device provides a display of all of the encoding signals being transmitted within the communications network over a particular time period while the device at the decoder provides a visual indication of the operation of the peripheral recording devices as well as the programming sequence as set by the microprocessor under control of the microprocessor software.

BRIEF DESCRIPTION OF THE FIGURES

Other objects and advantages of the present invention will become apparent from a study of the following specification when viewed in the light of the accompanying drawing in which:

FIG. 6 is a graphical representation of an alternate embodiment of the encoding signal wherein the addressing and command information is transmitted separately on the satellite communications network shown in FIG. 1.

DETAILED DESCRIPTION

Figure 1:
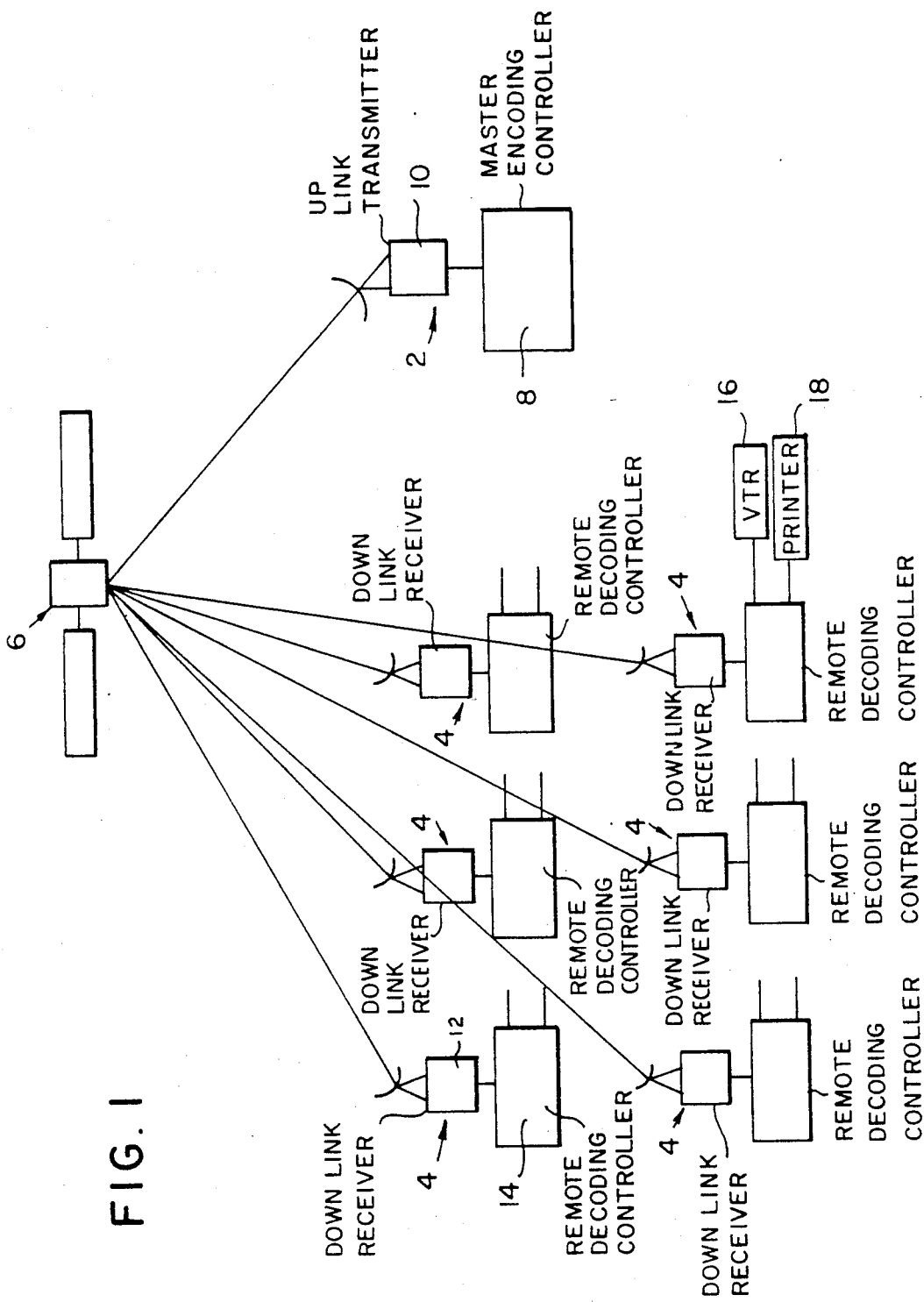
FIG. 1 is a block diagram of the satellite communication network according to the invention.

Referring first to FIG. 1, there is shown in block diagram form the satellite communication network according to the preferred embodiment of the invention. The network includes a broadcasting station 2 and a plurality of receiving stations 4 which preferably comprise local television stations which are remotely located relative to the broadcasting station. The signal transmitted from the broadcasting station 2 is normally encoded as will be developed in greater detail below and transmitted to a communications satellite 6 which retransmits the encoded signal to the local receiving television stations 4.

The broadcasting station comprises a master encoding/controller 8 which generates the encoded signal and an uplink transmission device 10 for transmitting the encoding signal to the satellite 6. Each receiving television station 4 comprises a downlink receiver 12 and a remote decoding/controller 14 which is connected with the downlink receiver. The receiver receives the signals transmitted from the satellite 6 and the remote decoding/controller is operable to both select the portion of the transmitted signal to which the television station has subscribed and to decode the encoded signal received from the satellite to control the operation of various peripheral devices such as a video tape recorder (VTR) 16 and a printer 18 which may be provided with each of the remote decoding/controller devices.

Figure 2:
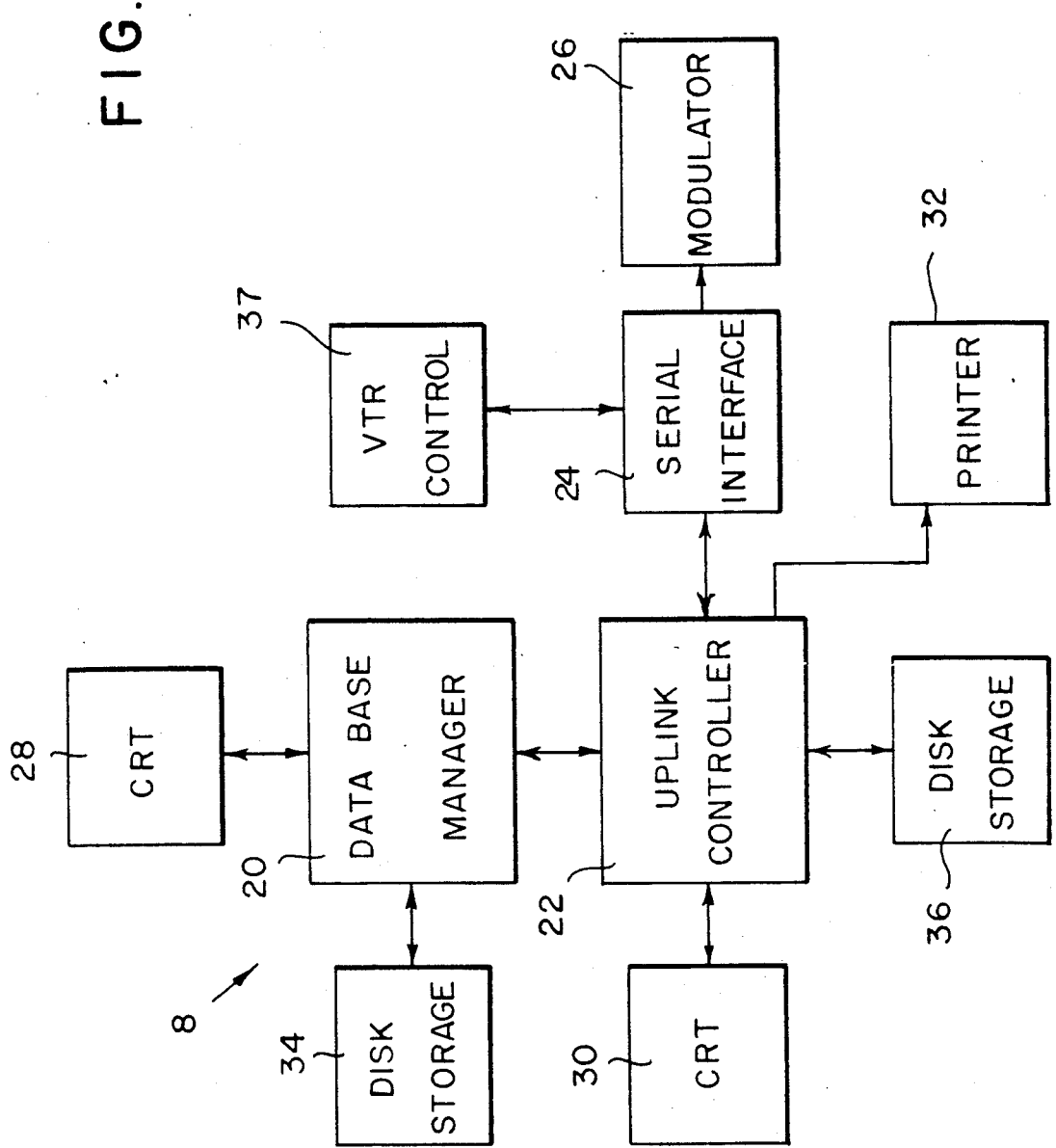
FIG. 2 is a block diagram of the system transmitter and encoding device.

Referring now to FIG. 2, the structure of the master encoding/controller device at the transmit site will be described in more detail. The master encoding/controller 8 essentially comprises two major parts: a data base manager 20 and an uplink controller 22. The data base manager is essentially a computer containing software which programs the computer allowing entry and editing of data whereby the data is arranged into an appropriate organized form prior to transfer to the uplink controller 22 which is also a computer. Software for the uplink controller 22 allows the data to be transmitted in the intended sequence and also allows testing and initialization of the equipment in the field.

The data base manager stores the information regarding the programming and the distribution of that programming to the various remote receiving stations. This programming distribution relates to the length of program, source, text, and destination in accordance with the subscription of each receiving station. The data base manager generates a time table of the uplinking activity for each day and transfers that information to the uplink controller 22 with which it is connected. The uplink controller 22 generates the data stream containing information relating to command addressing and video data. The addressing information is used to direct selected portions of the programming to various ones of the receivers in accordance with the addresses thereof. The command information is used to control the operation of the various peripheral devices at each of the receiving stations to record the appropriate video information signal in accordance with the subscription service of each remote receiving station. The video signal is that portion of the programming which is actually to be received by each receiver. This video signal may comprise, for example, a commercial, a public service message, a television program, or the like.

The uplink controller 22 generates a data stream containing the video, addressing, and command information in accordance with the distribution signal. A serial interface device 24 is connected with the uplink controller for converting the parallel data stream from the controller 22 into a serial data stream, and a data modulator 26 is connected with the serial interface device for encoding or converting the serial data stream to a radio frequency for transmission via the uplink transmitter 10. A first cathode ray tube (CRT) display device 28 is connected with the data base manager 20 and a second cathode ray tube (CRT) display device 30 is connected with the uplink controller 22 as shown in FIG. 2. The CRT devices provide a display to the operator at the broadcasting station affording monitoring, editing and testing access to the uplink or transmitted data stream. More particularly, the first CRT 28 allows entry, editing and formatting of data while the second CRT 30 allows control over transmission and provides testing and initialization. A printer 32 is connected with the uplink controller to provide a hard copy printout of the uplinking activity, for storage of the activity, of the broadcast station 2 for a given time period such as a day, week, or month. A disk storage device 34 is connected with the data base manager 20 to provide a location for storing data for use in data entry, editing and formatting. A second storage device 36 is connected with the uplink controller 22 to provide a location where data is stored prior to and during transmission. A video tape recorder (VTR) control device 37 under control from the uplink controller 22 provides a source of other program material to be transmitted with the data and also provides an isolated interface between the satellite communication system of the present invention and the video tape recording device under remote control from the broadcast station. The control is provided with dry closure relay contacts operating on the functions of the ready, record, play, and stop control buttons of the video tape recording device. The feedback from the video tape recorder is isolated through optoisolators. Remote control from the control device 37 is provided for more than one remote VTR device.

Figure 3:
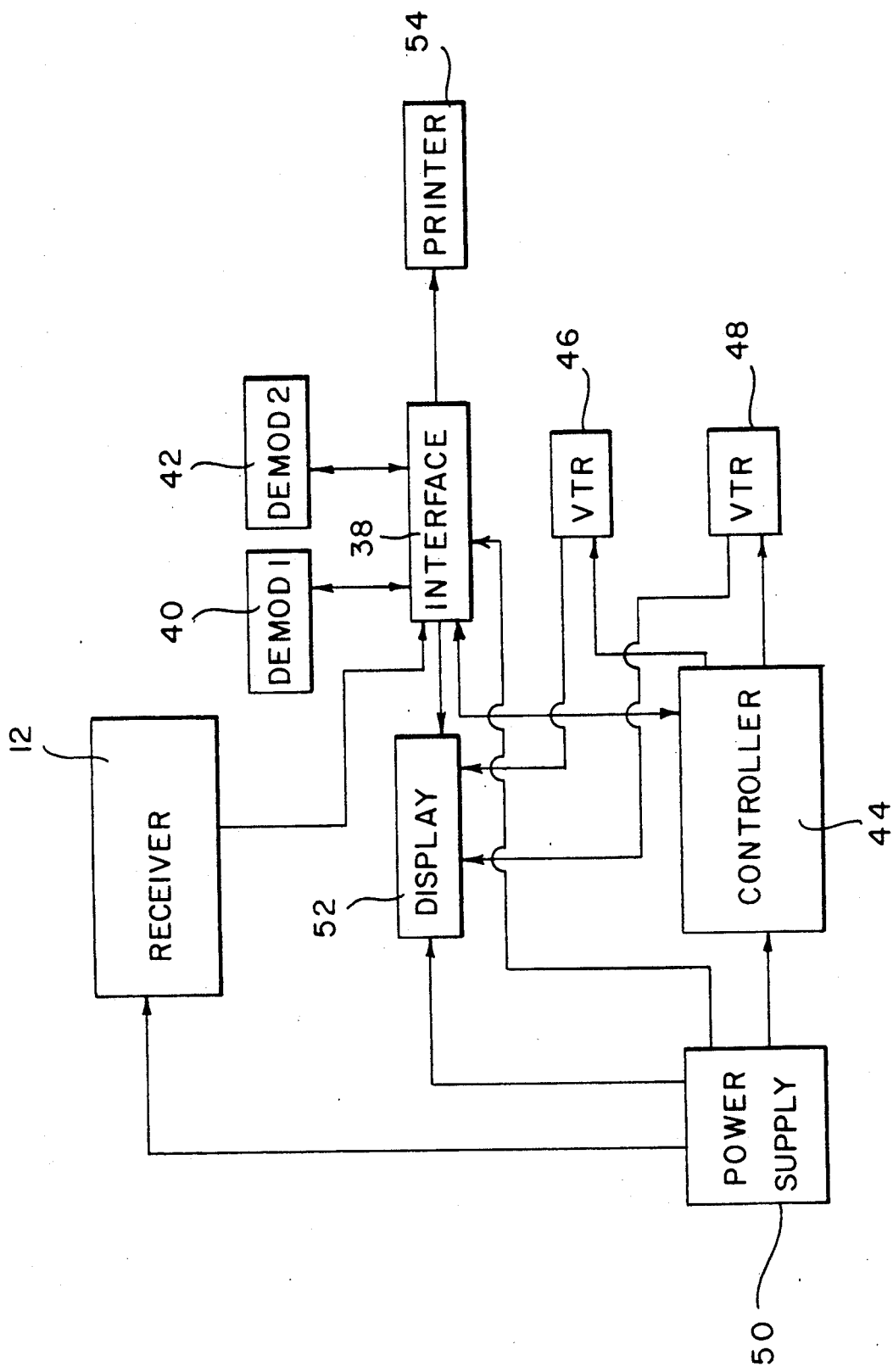
FIG. 3 is a block diagram of the system receiver and decoding device.

Referring now to FIG. 3, the receiver and remote decoder/controller device for each remote television station 4 will now be described. Each remote station includes a down link receiver 12 for receiving from the satellite 6 the encoded signal. As will be developed below, the receiver is responsive to the addressing information contained within the encoded signal for receiving at least a portion of the encoded signal at the remote location from the transmitter. A data interface device 38 is connected with the receiver. The interface 38 includes a signal splitter and distributes power among the peripheral devices. Serial to parallel converters are provided for the first and second demodulator devices 40, 42, an electrical control is provided for the display 52, a parallel port is provided for the printer 54 and an electrical interface and address decoding are provided for the controller 44. The first and second demodulator devices are operable to convert the encoded radio frequency signal into a serial data stream and the interface device converts the serial data stream to parallel for operation of the controller 44 comprising part of the remote decoding/controller 14 at each receiving station. The controller 44 is a computer operated under control of a software program that controls the operation of the system at the subscriber in the manner established by instructions contained in an EPROM.

As shown more particularly in FIG. 3, the controller is connected with the interface device 38 and is operable to control the operation of first and second video tape recording (VTR) devices 46, 50. It will be apparent to those of ordinary skill in the art that only one video tape recording device need be provided. However, more than one video tape recorder may be provided to increase the versatility of the overall system and to provide a backup when the tape on a first recording device is filled. A power supply 50 is provided at each receiving station for providing a power source for the receiver and for the controller. A display device is connected with the interface 38 and with the VTR devices 46, 48 to provide a visual indication of the operation thereof. Similarly, a printer 54 is connected with the interface device to provide a hard copy readout of the received encoded signal.

Figure 4:
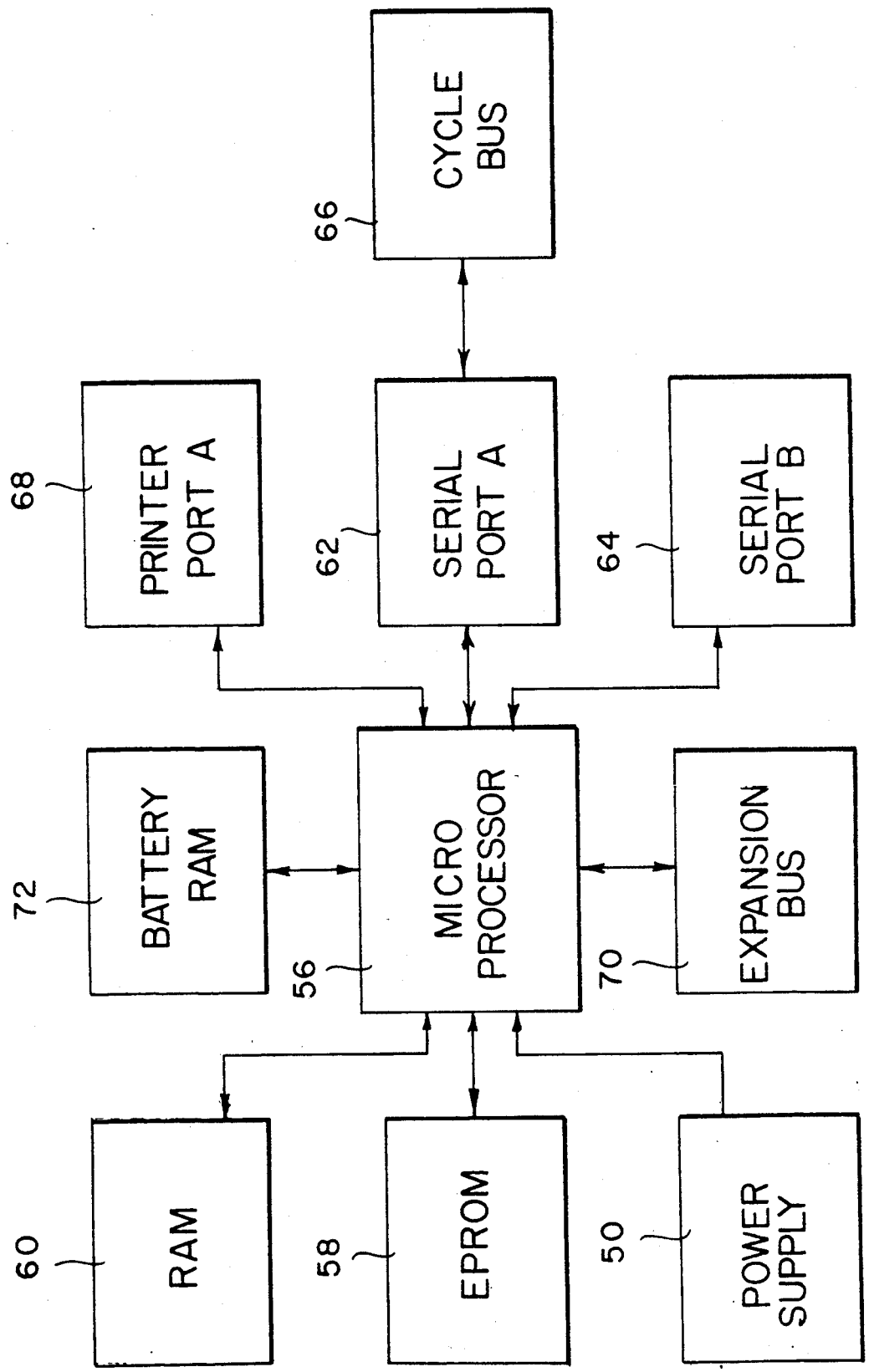
FIG. 4 is a block diagram of the decoder controller of the system of FIG. 3.

The operation of the decoder/controller 44 will be described in more detail with reference to FIG. 4. This controller includes a microprocessor 56 which executes instructions and responds to addressing and command information from the parallel data stream generated by the interface 38 to control the operation of the video tape recorders and the printer. An EPROM 58 is connected with the microprocessor and contains software for microprocessor operation. The microprocessor is controlled not only by the software contained in the EPROM 58 but also by command information obtained from the data stream. The addresses for each remote station are stored in a random access memory 60. These addresses may be modified by commands from the encoded data stream from the broadcast station. The microprocessor routes commands and data based on addressing to the appropriate device. These devices include the video tape recorders 46, 48 and the printer 54. Serial ports 62 and 64 are connected with the microprocessor and convert parallel data to serial data and serial data to parallel data. A cycle bus 66 is connected with the serial port 62 and enables data received by the system of the subscriber to be transferred to other devices. A printer port 68 allows the printer 54 (FIG. 3) to interface with the microprocessor 56, and the expansion bus 70 enables the decoder/controller 44 of FIG. 4 to interface with other decoder/ controllers. The expansion bus contains addressing, data, clock, interrupt, and direct memory access signals, as well as system power. A battery RAM 72 is connected with the microprocessor 56 and provides a storage location for addressing and control information in an electrically nonvolatile environment while affording rapid access for the microprocessor.

The software for the controllers 22 and 44 can be written by any programmer to meet the needs of the system. Two types of software include the synchronous packet format and the asynchronous non-packet format.

Figure 5:
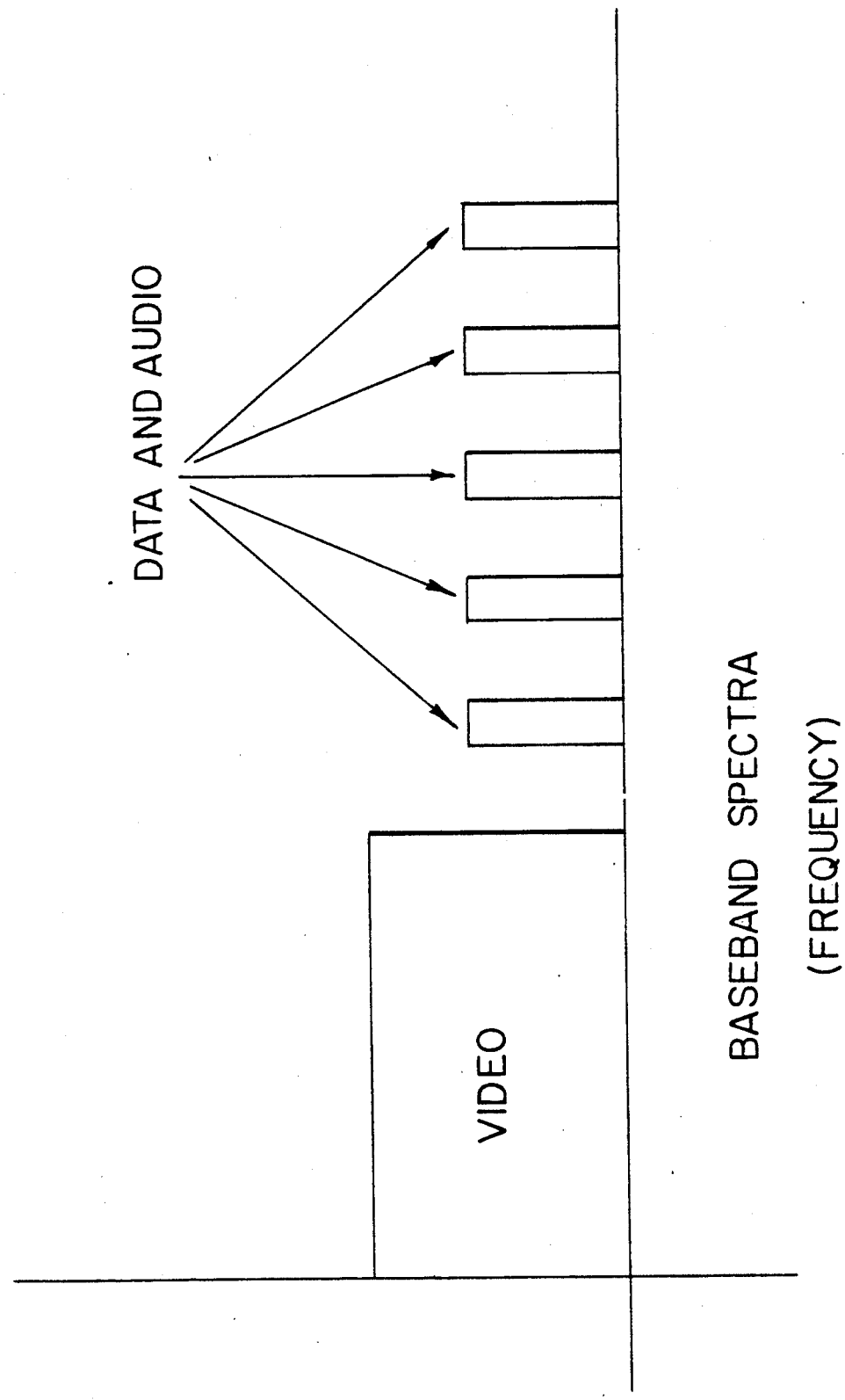
FIG. 5 is a graphical representation of one embodiment of the encoded signal containing video addressing and command information.

FIGS. 5 and 6 are graphical representations of different embodiments of the form of encoding the video, command, and addressing signals. In FIG. 5, there is shown a graphical representation of the remote control signal transmitted as a composite of video, audio, and control and addressing data whereas in FIG. 6, a graphical representation of separately transmitted signals is shown.

The remote control provided in accordance with the present invention provides selective or multiple addressing in a dynamic, remotely configurative fashion. The data signals shown in FIGS. 5 and 6 contains general data as well as addressing and control information. The functions in the receiving end of the system are individually addressable and provide for selective control and routing of control and general data to the appropriate devices.

OPERATION

The text and transmission schedule is entered into the data base manager 20 and the program for organizing and sorting the data in accessed through the CRT 28. The organization and sorting of data in preparation for transmission is controlled by software and the data base manager 20. The data, scheduling, and text to be sent to the various remote sites are entered, organized, and sorted. The raw data, program details, and sorted information is stored on the disk storage device 34. The organization and sorting of data is set up for the best transmission as far as addressing and control sequencing are concerned.

The data for transmission is stored in the data base manager 20 until the day of transmission when the data is transferred to the uplink controller 22. The data is sorted, edited, and prepared for transfer to the uplink controller 22 which provides the environment for information transmission. The CRT 30 allows access to the program for testing, editing and to initiate transmission. The disk storage device 36 stores the information downloaded from the data base manager 20 as well as test and maintenance programs and information. When transmission is to begin, the serial interface 24 provides access to the local VTR 37 and the modulator 26. The uplink controller 22 controls the printer 32 for logging of events.

Alternatively, the uplink controller takes the information from the data base manager and prepares the data for transmission by setting up files of grouped addresses, data, and control signals as well as a table of where the material for video transmission is located on a master tape located at the transmit site.

Once loaded, the uplink controller waits for a "cue", which may be manually input from a keyboard, to start transmission. Alternatively, per an internal clock to the uplink controller, the transmission may also be initiated. The uplink controller then starts and stops the local video tape source. The controller transmits addressing, control and text information for the duration of the scheduled transmission. This information is fed to the modulator 26 and incorporated with the video and audio sub carriers. The signal then proceeds to the satellite.

At the receiver 12, the video, audio, and data carrier signals are split apart. More particularly, at the receiver, the video and audio is demodulated. The data is tuned by a separate unit that makes use of the signal from the receiver. The data carrier is routed by the interface 38 to the demodulators 40, 42 where it is filtered and restored to proper DC levels. The data is then directed to a data conversion device on the interface 38.

The controller 44 interprets the data stream to validate the message by searching for the correct header, correct message length, correct message type, correct count, and correct CRC check. If the message is valid, then the address of the message is checked to determine if the address is one of the addresses listed in the address table. The next item check is the message type to determine whether it is a control function (i.e. turn on a VTR), an addressing function (i.e. add an address to the table), a print function (i.e. print text) or a cycle bus function (i.e. route message to cycle bus). The next step is to act on the instruction and the last step is to loop back and evaluate the next message.

The above steps are repeated until all of the messages have been received.

The main function of the controller after addressing and message validation is as a message switch to direct the message to the peripheral devices (i.e. printer, VTR, cycle bus, etc.)

Messages that are sent to the cycle bus are received by the controller and enter the serial interface. The controller looks at the data stream and validates the message (correct header, message length, message type, and count).

The decoding controller of the present invention has contained therein 256 different device addresses as well as the ability to be addressed by 250 different 16 character addresses. The 250 addresses consist of as many as 16 characters and can be altered remotely through addition or subtraction at the broadcasting station. This allows for the network of the invention to be restructured to suit the needs at the time of addressing and control for programming distribution. Internal controls include addressing changes, frequency changes, test functions, video tape recorder control and testing, and printer control and testing. The addresses that are not used internally are sent to the serial interface bus and are then used by interfaces to the serial interface bus. The bus interface can have 250 different 16 character addresses and may route data and control information to the devices attached thereto. The type of addressing structure from the system to the bus interface form an expanding addressing pyramid away from the satellite communication network according to the invention.

The present invention has been described with regard to the transmission and reception of video information. It will be appreciated that any type of message may be transmitted including audio information or a combination of audio and video information.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. A satellite communications network, comprising
   (a) encoder means for encoding a composite signal including message, addressing and command information, said encoder means including
     (1) a data base manager containing programming and data distribution information and producing a distribution signal; and
     (2) an encoder controller connected with said data base manager for generating a data stream containing message, addressing, and command information in accordance with said distribution signal;
   (b) transmitter means connected with said encoder means for transmitting said encoded signal to a satellite;
   (c) a plurality of receiver means responsive to said addressing information for receiving at least a portion of said encoded signal from said satellite in accordance with said distribution signal at a remote location from said transmitter means;
   (d) decoder means connected with said receiver means for decoding said received portion of said encoded signal, said decoder means including a controller comprising a microprocessor which responds to addressing and command information from said composite signal to produce a control signal; and
   (e) recorder means connected with said microprocessor for recording message information from said decoded signal in response to said control signal.

2. Apparatus as defined in claim 1, wherein said encoding means further comprises (1) serial interface means for converting said data stream from said encoder controller into a serial data stream; and (2) data modulator means connected with said serial interface means for encoding said serial data stream for transmission.

3. Apparatus as defined in claim 2, and further comprising a display device connected with said encoder controller for monitoring said encoded data stream.

4. Apparatus as defined in claim 3, and further comprising a printer connected with said encoder controller for printing a hard copy of said encoded data stream, thereby providing a record of the transmitted data.

5. Apparatus as defined in claim 2, wherein said decoder means includes
   (a) data demodulator means for converting said encoded signal to a serial stream; and
   (b) data interface means connected between said receiver means and said data demodulator means for converting said serial data stream to parallel for operation of said decoder controller.

6. Apparatus as defined in claim 1, wherein said decoder controller further comprises
   (a) an EPROM device containing software for operating said microprocessor; and
   (b) memory means containing addressing information corresponding with said receiver.

7. Apparatus as defined in claim 6, wherein said recorder means comprises at least one video tape recorder.

8. Apparatus as defined in claim 7, wherein said recorder means comprises at least one printer for producing a hard copy of the video signal information recorded by said video tape recorder.

9. Apparatus as defined in claim 6, wherein said decoder controller further comprises display means for indicating the mode of operation of said controller.

* * * * *